Feb. 8, 1944.                J. C. HOFF                2,341,274
                    GRAVITY SPENT BEER SCREEN
                    Filed Aug. 8, 1940          2 Sheets-Sheet 1
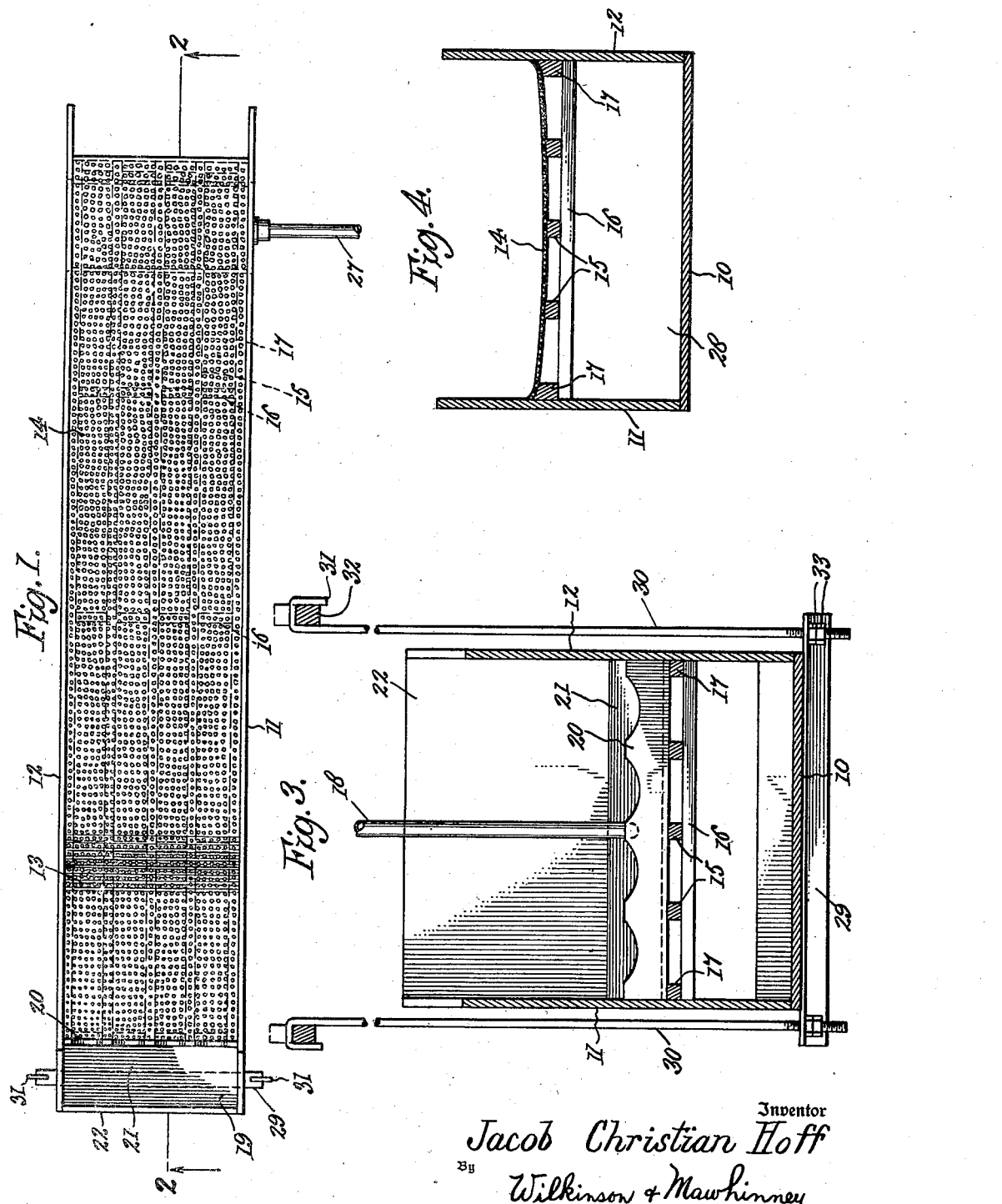
Inventor
Jacob Christian Hoff
By Wilkinson & Mawhinney
Attorneys.

Feb. 8, 1944. J. C. HOFF 2,341,274
GRAVITY SPENT BEER SCREEN
Filed Aug. 8, 1940 2 Sheets-Sheet 2
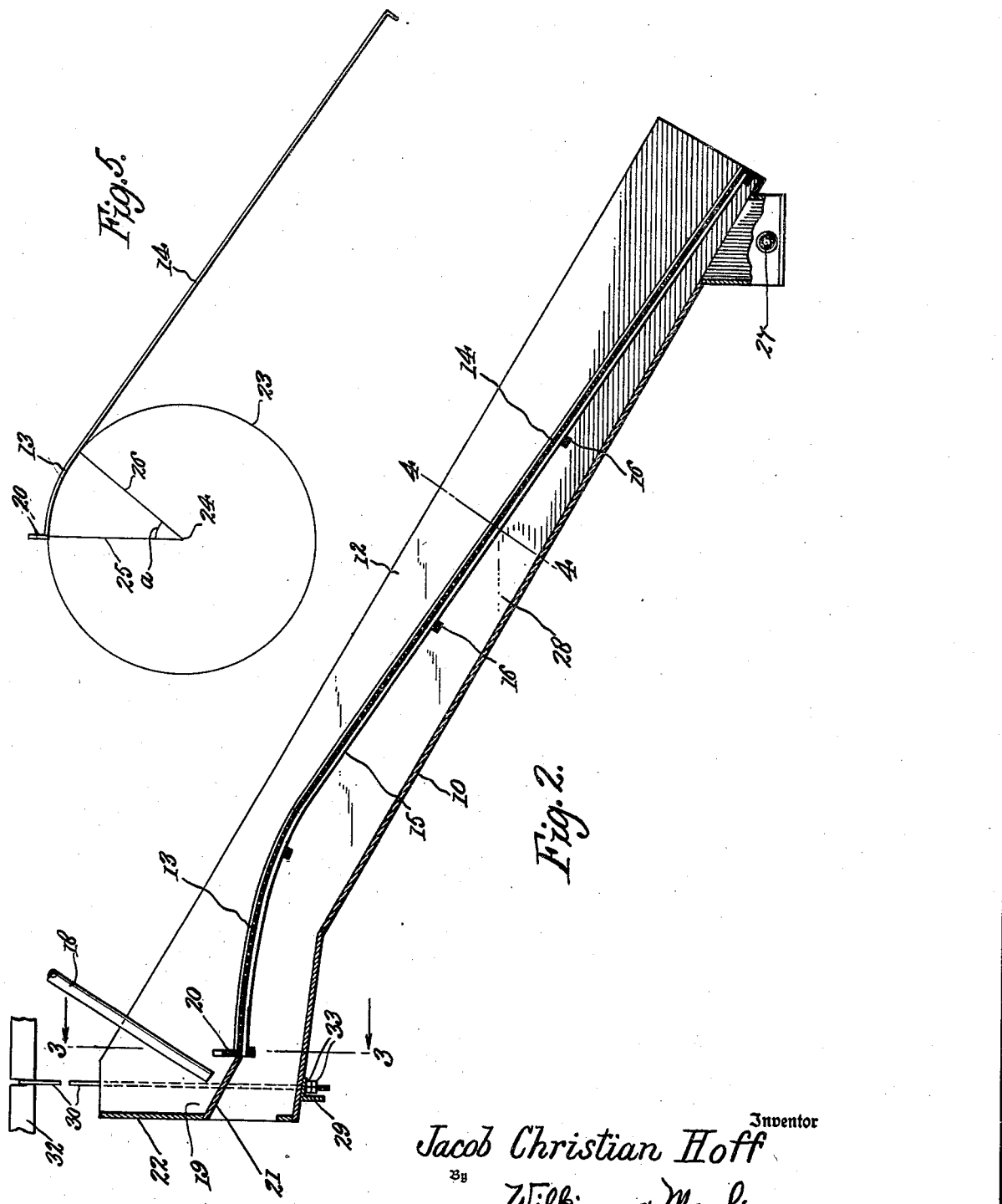
Inventor
Jacob Christian Hoff
By
Wilkinson & Mawhinney
Attorneys.

Patented Feb. 8, 1944

2,341,274

UNITED STATES PATENT OFFICE 2,341,274

GRAVITY SPENT BEER SCREEN

Jacob C. Hoff, Baltimore, Md., assignor to Frankfort Distilleries, Incorporated, Louisville, Ky., a corporation of West Virginia Application August 8, 1940, Serial No. 351,796

5 Claims. (Cl. 210—149)

The present invention relates to improvements in gravity spent beer screens, and more particularly to a screen assisting in the recovery in a dry house of a distillery the spent grain used in the manufacture of whiskey.

Rye, corn and barley are prominently used for the distillation of spirituous liquors and alcohol. After fermentation and distillation these grains are suspended in liquid which is referred to in distillery practice as spent beer, the practice being to convey the spent beer liquor from the distillery to a dry house where a separation is made of the liquid from the grain, the grains dried and bagged, such dried grain forming an important valuable recovery by-product of a distillery and being sold and utilized for cattle feed.

The de-watering of such spent beer is therefore an important item in prevailing distillery methods and practice. Ordinarily the spent beer is piped from the distillery into the dry house and there delivered to an inclined gravity screen which in the first instance reduces the liquor content in a rough manner, after which the grain is delivered to a press and to other apparatus well known in the industry.

The present invention is concerned with an improvement in the gravity screen.

Heretofore great difficulties have been experienced in the utilization of a gravity screen because of the nature of the spent beer. This beer is a rather heavy liquid initially in the condition in which it is first delivered to the screen but as the removal of its liquid content takes place it becomes comparatively light and fluffy and builds up to high masses upon the screen cloth losing, as it loses its water, the necessary weight to cause it to slide down the inclined screen with sufficient gravity movement. Hence rotary and endless movable paddles have had to be employed to force this grain residue down the screen. Such movable parts require machinery to operate the same involving rather high operating and maintenance costs.

An object of the present invention is to dispense with such machinery and all movable parts together with the original cost of the same and the costs of operation, repair and other maintenance.

Another object of the invention is to simplify the form of the screen, while increasing its efficiency, that is its capacity to remove the liquid from the spent beer without causing any sluggish action in the residue, but rather promoting the movement of the grain residue down the screen cloth.

A further object of the invention resides in providing a screen having the above characteristics in which a limited adjustment is afforded for the purpose of making those characteristics most efficient.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a top plan view of an improved gravity spent beer screen constructed in accordance with the present invention.

Figure 2 is a longitudinal vertical section therethrough taken on the line 2—2 in Figure 1.

Figure 3 is an enlarged cross-section taken on the line 3—3 in Figure 2.

Figure 4 is an enlarged cross-section taken on the line 4—4 in Figure 2, and

Figure 5 is a diagrammatic view showing the plotting of the curved and tangential portions of the screen bed or cloth.

Referring more particularly to the drawings 10 designates the solid bottom of the screen box and 11 and 12 the solid or imperforate side walls thereof.

The improved screen bed or cloth is supported within the box in any appropriate manner spaced above the bottom and comprising generally an upper curved section 13 and a lower inclined tangential section 14.

In the instance shown, particularly in Figure 4, the screen cloth is supported upon longitudinal rails or strips 15 of an appropriate number spaced apart and in turn supported upon the transverse bars 16. Such transverse bars are secured to the side walls 11 and 12. The end rails or strips 17 may have curved or inclined upper surfaces to cause an upcurving of the side edges of the screen cloth up to the side walls 11 and 12 to facilitate the passage of the grain down the inclined screen. In the embodiment of the invention which is now being successfully used No. 00 mesh screen is employed, being a perforated copper screen. The screen box referred to is approximately 40" wide while the screen itself is approximately 36" wide, the box and the screen being approximately 14' long. The box is of wood although it obviously may be made of other materials.

The spent beer is led in through the inlet pipe 18 from the beer still, this pipe being preferably arranged on the angle indicated in Figure 2 and having its discharge lower end disposed substantially centrally of the inflow reservoir 19. This inflow reservoir is arranged back of a weir or dam 20 which extends transversely across the box above the rounded section 13 of the screen. The weir is saw toothed as indicated in Figure 3 in order to promote uniform flow of the spent beer over the top of the weir throughout the transverse width of the box. This tends to uniformly supply all the transverse portions of the screen with the spent beer liquor. The inflow reservoir 19 has a solid imperforate bottom 21 which is disposed on a sharp acute angle with the weir 20 and rises up abruptly on a line at substantially right angles to the axis of the inlet pipe 18 to meet the head wall 22 of the box. Thus the inflow reservoir 19 is included between the weir 20 and the head wall 22 and is confined by the sides 11 and 12 of the box and has the diagonal bottom 21 which maintains the reservoir shallow with respect to the height of the weir 20, it being the object to maintain the reservoir as shallow as possible to prevent the solid content of the spent beer from settling behind the weir locally in places which would avoid the uniform flow of the liquid over the weir.

Any clogging at local points would put corresponding areas of the screen out of action and would thus interfere with the full utilization of the screen and its capacity functioning. The inclined wall 20 forms a deep end just at the weir but a shallow trough as a whole growing shallower progressively toward head wall 22. Thus the inclined wall 21 induces flow downwardly toward the deep end and toward the weir 20 and tends to cause a constant agitation within the reservoir which prevents settling of the solid material.

The deep end provides for an expanding of the material in the reservoir all the way across the box, which also promotes movement and agitation in the material. This constantly agitated material in the deep end when it rises to the top of the weir may flow over upon the screen section 13. The inclination of wall 21 also induces this flow over the weir.

Referring more particularly to Figure 5, a schematic drawing is shown of a circle 23 having a center 24 and radii 25 and 26 subtending an angle alpha. The radius 25 is vertical and intercepts the weir 20 at the top of the circle 23. The curved section 13 of the screen is shown as being the arc included by the angle alpha and between the radii 25 and 26. The remaining section 14 of the screen which is the major length of the screen is on a tangent to the circle 23 coming off the circle at the radius 26, at which point the two sections 13 and 14 of the screen meet. This section 13 of the screen occupies half or more of one of the top quadrants of the circle 23. The diameter of the circle on which the screen section 13 is struck is very large so that the curvature is gentle and the length of this screen section 13 is comparatively long.

The thin slop outlet is indicated at 27 being near the bottom of the box and communicating with that space 28 of the box below the screen. This thin slop which passes through the screen forms the filtrate. The residue of grain passes down the inclined screen.

As shown more particularly in Figure 3, the upper end of the box is supported upon an angle iron or other supporting rail 29 the ends of which project beyond the side walls 11 and 12 of the box and are perforated to receive the lower threaded ends of the rods 30. The upper ends of the rod are formed with hooks 31 to hook over beams 32. Adjusting and lock nuts 33 are run upon the lower threaded ends of the rods 30 below the rail 29.

In the use of the device, the spent beer enters the pipe 18 and is delivered thereby to the reservoir 19 in which it is dammed up in a shallow constantly agitated mass to cause it to flow uniformly over the weir 20 and initially onto the uppermost portion of curved screen section 13. Due to the fact that this initial portion of screen section 13 is at the top of a circle of great circumference, this initial portion is substantially horizontal so that the spent beer at this portion of the screen will have only a very slow motion induced by the direction and the momentum of the flow of the material over the weir which is kept at a low height so that both the screen and the weir contribute to the slow initial motion of the material in its screening operation to permit the material to be rapidly dewatered at an initial stage of its screening. Due to the curvature of screen part 13 progressive sections of the screen area will incline downwardly to constantly greater extent and thus the material will progressively come under the greater force of gravity as it moves down the screen section 13. The force of gravity upon the material will therefore be accelerated in proportion as the material is dewatered. The screen section 13 curving from the weir 20 to the tangent section 14 constantly subjects the progressively drier material to a faster descending motion. This enables the tangent section 14 of the screen to be placed on a steeper inclination downwardly than has been heretofore possible to enable the descent by gravity alone, without the use of mechanical movable paddles or other parts, of the residue which is at the time it reaches the lower section 14 separated from most of the water content which can be separated by screening. In other words the arrangement and construction relatively of the two screen sections 13 and 14 induce automatic flow of the residue down the complete length of the screen and into the press below without the use of mechanical movement machinery to assist this flow and descent of the residue.

In case the coarse residue material does not move down with the desired speed, the nuts 33 may be run up on the rod 30 thus causing a lifting action at the upper portion of the box and consequently a tilting action at the lower end of the box, such lower end acting as a fulcrum and in this way the angle or the pitch of the screen may be changed. To avoid too great a movement of the material down the screen, the nuts 33 may be adjusted downwardly. It is not essential that the lower end of the screen box shall act as a fulcrum. This end of the box may be secured to the press or other parts, the box having sufficient length and flexibility to permit of the adjustment through the nuts 33 of the upper portion of such box to change the effective angle or pitch of the screen.

Preferably the pipe 18 has the axis of its delivery end at substantially right angles to the inclined bottom 21 and projecting down to a point approximately at the liquid level of the reservoir 19, this arrangement preventing such great surging of the material in a reservoir of this kind as would cause great surges of the spent beer to flow over the weir at one or more points irregularly incident to the head or pressure of the material in the inlet pipe 18.

Also the weir 20 is very low with reference to the inclination of the bottom wall 21 to keep the liquid shallow in the weir and for purposes already stated.

It is obvious that various changes and modifications may be made in the details of construction and design of the above specifically described embodiment of this invention without departing from the spirit thereof, such changes and modifications being restricted only by the scope of the following claims:

What is claimed is:—

1. A gravity spent beer screen comprising an inlet reservoir having a diagonal bottom, a substantially vertical low weir rising up from the lower portion of said diagonal bottom, said weir having a saw toothed upper edge, an inlet conduit for the spent beer having its axis disposed substantially normal to the plane of the diagonal bottom and with its delivery mouth substantially at the level of the material in said inlet reservoir, said conduit being adjacent said weir, and a screen extending down from said weir and disposed to receive material from the reservoir over said weir.

2. A gravity spent beer screen comprising an upper section of arcuate convex form, and a lower screen section inclined downwardly from the lower end of said arcuate section, said upper and lower screen sections having a slight transverse curvature in cross-section with the side portions of the screen disposed above the center portions thereof.

3. A gravity spent beer screen comprising a top section struck on the upper portion of an upper quadrant of a circle, and a lower inclined section extending off the lower end of the upper curved section tangentially of said circle at the greatest inclination of such lower portion of the curved screen, said screen having minute perforations therein and being curved transversely with the side portions of the screen disposed above the central portions thereof.

4. A gravity spent beer screen comprising a top section struck on the upper portion of an upper quadrant of a circle and a lower inclined section extending off the lower end of the upper curved section at the greatest inclination of such lower portion of the curved section, said screen having minute perforations therein, and means to adjust the upper portion of the screen vertically to vary the inclination of the screen.

5. A spent beer screen comprising an inlet reservoir, said reservoir composed of a diagonal bottom and an upstanding weir rising from the lower portion of said diagonal bottom, said weir having a saw-toothed upper edge, means for introducing spent beer into said inlet reservoir, and a screen extending down from said weir and disposed to receive material from the reservoir of said weir.

JACOB C. HOFF.